June 10, 1930.   G. W. THOMAS   1,763,275
GLAZING CONSTRUCTION
Filed Nov. 23, 1928   2 Sheets-Sheet 2
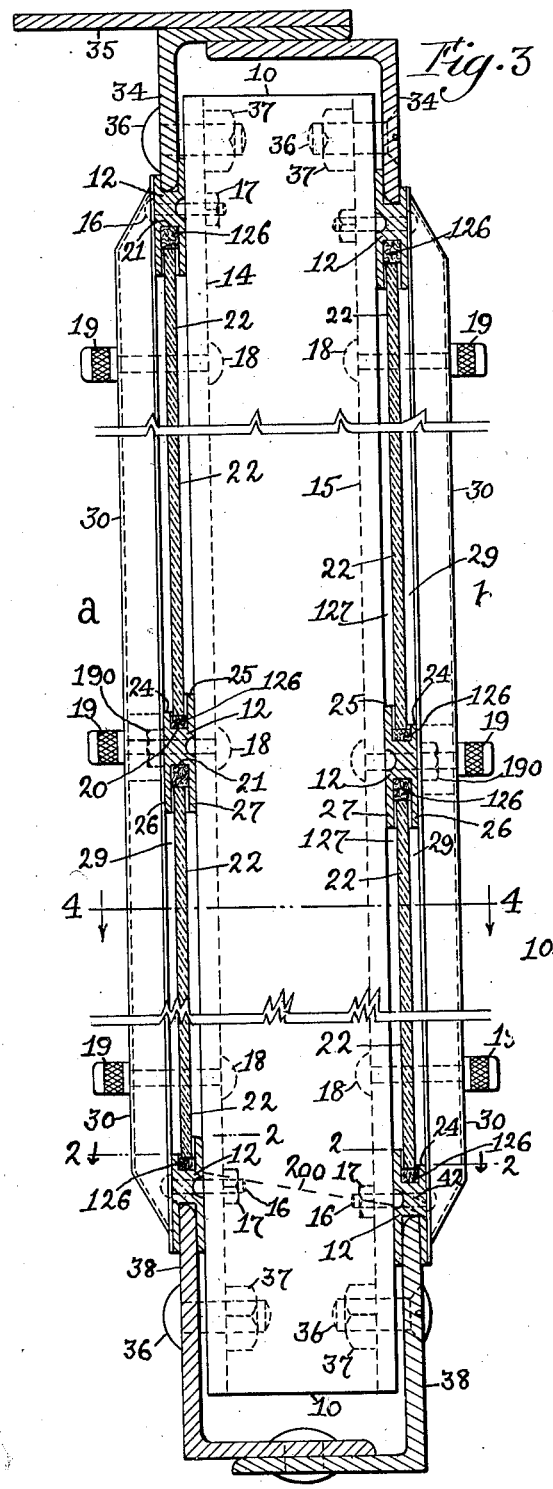
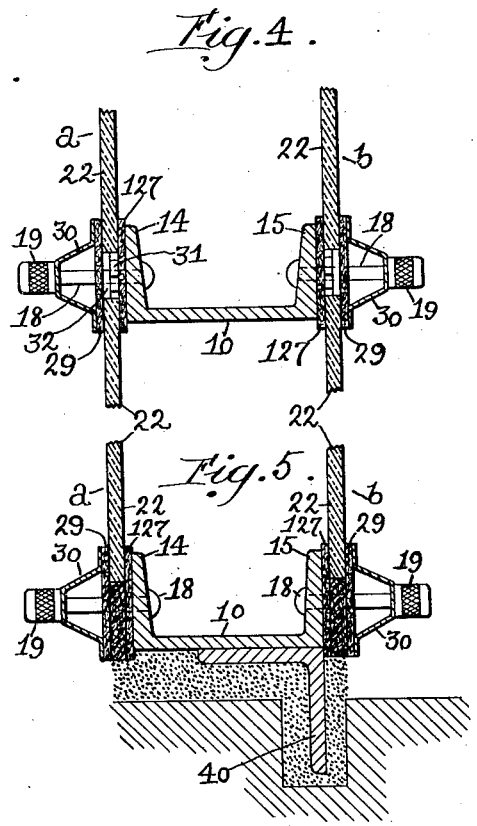
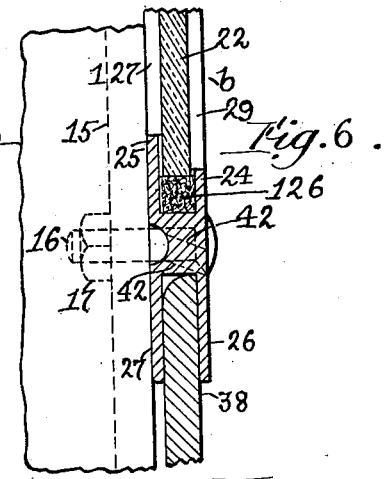

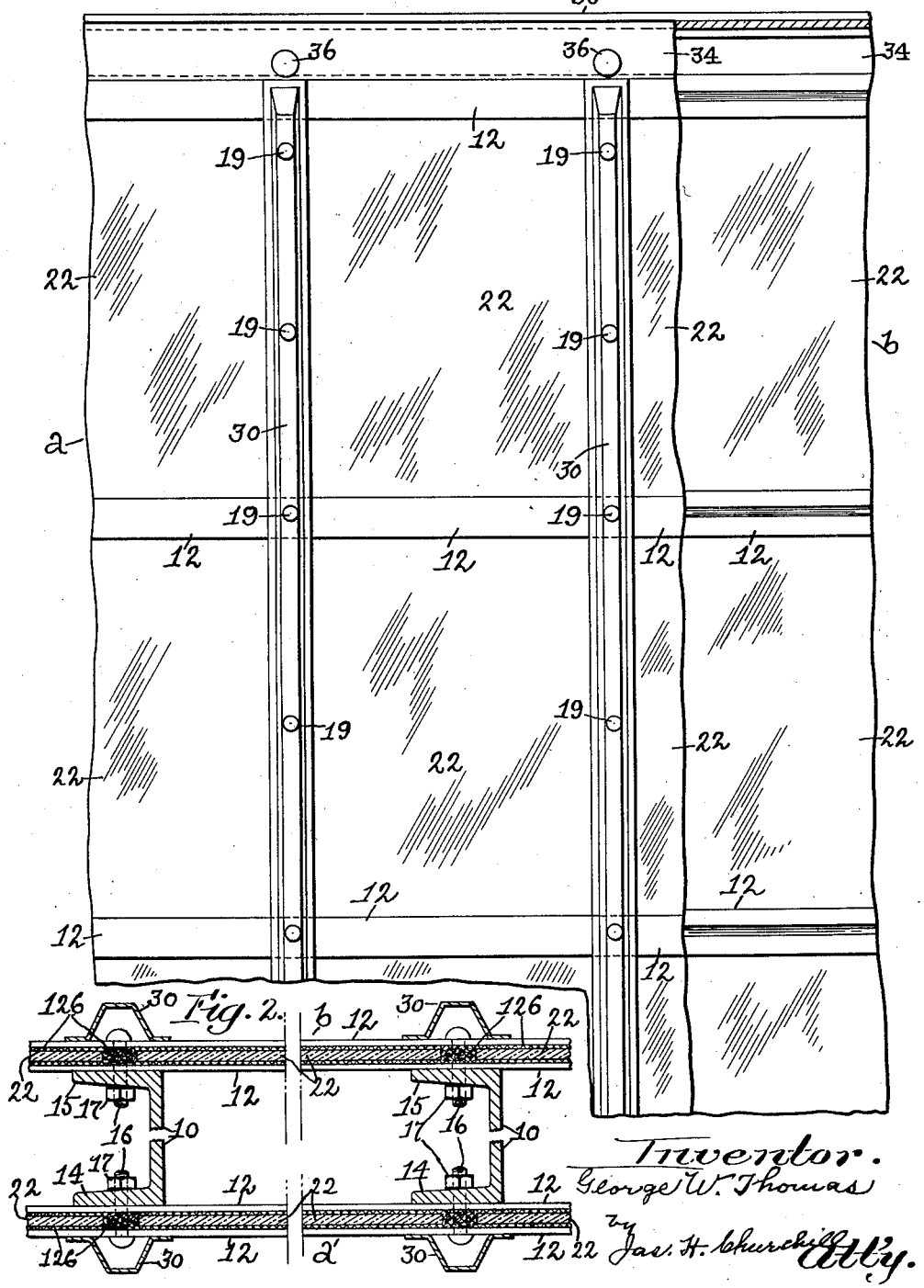

Patented June 10, 1930

1,763,275

UNITED STATES PATENT OFFICE

GEORGE W. THOMAS, OF PITTSBURGH, PENNSYLVANIA, ASSIGNOR TO H. H. ROBERTSON COMPANY, OF PITTSBURGH, PENNSYLVANIA, A CORPORATION OF PENNSYLVANIA

GLAZING CONSTRUCTION

Application filed November 23, 1928. Serial No. 321,412.

This invention relates to a building construction and more particularly to a glazing construction forming part of the building.

The invention has for its object to provide a superior building construction which may be embodied in the roof of the building, but which is particularly adapted to be embodied in the upright walls of the building and especially the outside walls thereof which are provided with panes of glass or other light-transmitting members.

The invention further has for its object to provide a superior double glazing construction in which the individual panes of glass of one glazing sash member are accessible from within the building and can be removed and replaced without disturbing the panes of glass in the other glazing member on the outside of the building.

Provision is also made for obtaining effective heat insulation and for reducing to a minimum condensation on the inner glass.

Provision is further made for enabling steel or like corrodible metal load-supporting members to be employed with a minimum exposure of said corrodible metal members to the action of deleterious fumes and gases.

The invention further enables any condition of loading or span to be met and also to reduce glass breakage due to vibrations and settlements in the framework of the building.

These and other features of this invention will be pointed out in the claims at the end of this specification.

Fig. 1 is an elevation of a sufficient portion of a double glazing construction embodying the invention to enable it to be understood;

Fig. 2, a horizontal section on the line 2—2, Fig. 3;

Fig. 3, a vertical section of the double glazing construction shown in Fig. 1;

Fig. 4, a detail in horizontal section on the line 4—4, Fig. 3;

Fig. 5, a similar section at one side of the double glazing construction, and

Fig. 6, an enlarged detail in vertical section of a portion of the glazing construction shown in Fig. 3.

The double glazing herein shown comprises two members $a$, $b$, substantially parallel and separated by a substantial space, and which will be hereinafter referred to as the outer and inner glazing members.

The members $a$, $b$ are of like construction and a detail description of one will suffice.

The outer glazing member $a$ consists of a rigid glass-supporting frame, preferably of metal and composed of bars or members 10, 12 arranged substantially at right angles to each other and spaced apart to form openings which are closed by panes 22 of glass or other light-transmitting material. The bars 10 are herein shown as channel bars, and may be of an desired width and thickness to obtain the desired strength to carry the load and meet the conditions of use, and constitute supporting members for the double glazing construction.

The bars 10 when used in an upright wall are vertically arranged and the bars 12 are arranged horizontally on the outer sides of the bars 10 and are connected to the latter in any suitable manner and preferably as will be described. Each upright bar 10 is provided in the present instance with end flanges 14, 15, and the bars 12 of the outer glazing member $a$ are secured to the outer surface of the end flanges 14.

In the present instance the top and bottom transverse bars 12 are secured to the flange 14 by a bolt 16 and nut 17, and each intermediate transverse bar 12 is secured to the flange 14 by a bolt 18 and nut 190. The transverse bars 12 are preferably made in one piece and extend across and contact with the intermediate bars 10 (see Figs. 1 and 2) and overlap and are secured at their ends to the side upright bars 10. The transverse bars 12 are provided with longitudinally extended channels or grooves 20, 21 in their upper and lower surfaces for the reception of the top and bottom edges of the glass pane 22, the top edge of the glass being located in the bottom channel 21 of an upper cross bar 12, and the bottom edge of the glass being located in the upper channel 20 of the next lower cross bar 12.

Provision is made for the ready insertion and removal of the glass pane 22 from these channels, and in the present instance this is accomplished by making the front wall 24 of the channel 20 in the upper surface of the cross bar shorter or of less depth than the rear wall 25 of said channel, and by making the front wall 26 of the lower channel substantially equal in depth to the rear wall 27, so as to provide the cross bar 12 with a relatively deep channel on its under surface and with a relatively shallow channel on its upper surface. The channels 20, 21 are located in a plane beyond or outside of the plane in which the upright bars 10 are located as clearly shown in Figs. 2 and 3.

As a result, the upper edge of the glass pane 22 can be inserted into the deeper channel 21 on the under surface of an upper cross bar sufficiently to have the lower edge of the glass pane clear the shorter front wall 24 of the channel 20 in the upper surface of the next lower cross bar, and permit the lower edge to be moved down into the shallow channel 20 in the upper surface of the lower cross bar.

It will thus be seen that the cross bars 12 co-operate with the upright bars 10 to form a sash having cross bars provided with top and bottom channels of unequal depth located in a plane beyond or outside of the plane of the upright bars for the reception of the upper and lower edges of the glass pane.

The channels 20, 21 may and preferably will contain strips 126 of yielding material such as felt saturated with asphalt, which serve as cushions for the top and bottom edges of the glass.

The glass panes 22 are made of sufficient width to have their sides overlap the flanges 14 of adjacent upright bars 10, and the sides of two adjacent glass panes which overlap an intermediate upright bar 10 are cushioned by means of a strip 127 of asphaltic felt or other suitable cushioning material, which strips are preferably of substantially the width of the flange 14 of the upright bar 10 and cover the latter between adjacent cross bars 12, and said cushioning strips are thicker than the inner walls of the channels in the cross bars, so as to cushion the glass and hold the same out of contact with the metal sash.

The space between the sides of the glass panes which overlap the upright bar 10 is closed or sealed by a strip 29, preferably of asphaltic felt, (see Figs. 4 and 5), which strip contacts with the outer surfaces of adjacent glass panes which overlap the upright bar 10 and is held in close contact with said glass panes by a cap member 30, which extends lengthwise of the upright bars 10, and is secured to the latter by the bolts 18 and nuts 19.

The bolts 18 are located at different points in the length of the upright bar 10 and extend through the cap member 30 which is secured in place by the nuts 19.

Some of the bolts 18 may extend through the cross bars 12 (see Fig. 3) and others between the sides of the glass panes 22 which overlap the upright bar 10 (see Fig. 4) and in the latter case, it is preferred to provide the bolt 18 with a nut 31 which presses the felt cushion 127 into close contact with the bar 10, and also to mount a rubber or other yielding washer 32 on the bolt 18 between the adjacent glass panes 22, to cushion the latter.

The sealing strip 29 covers the outer surface of the sides of the glass panes between the upper and lower cross bars with which said glass panes are engaged, and is made slightly thicker than the outer walls 24, 26 of the channels 20, 21 in said cross bars so as to enable the cap member 30 to make uniform contact with the cross bar 12 and with the sealing strip 29 and obtain a weather-tight contact at the point of intersection of the cap member 30 with the cross bar 12.

The upper channel 20 in the uppermost cross bar 12 has inserted in it a member 34, preferably of metal, by means of which the outer glazing sash $a$ may be secured at its top to the framework of the building, which framework is represented by the bar 35 in Fig. 3. The member 34 is shown as an angle iron which is secured to the flange 14 of the upright bar 10 by a bolt 36 and nut 37 and is extended the width of the glazing member $a$.

The channel 21 in the under side of the lowermost cross bar 12 has extended into it a similar angle iron or member 38, which is secured to the upright bar 10 and also to the frame of the building and extends the width of the glazing member $a$.

The outer glazing member $a$ may be used alone where the conditions of use permit, but where the conditions call for a double glazing construction, the inner glazing member $b$ is employed and the channel cross bars 12 thereof are secured to the flange 15 of the upright bars 10.

It will be understood that the inner glazing member $b$ is a duplicate of the outer glazing member $a$, and the angle irons or members 34, 38 of the inner glazing member $b$ co-operate with like members 34, 38 of the outer glazing member $a$ to form top and bottom walls of a box-like structure, having its sides composed of glazing members which are secured to supporting members located in the box-like structure.

It is preferred to make the upright bars 10 of steel and the cross bars 12 and cap members 30 of aluminum, copper, or other non-corrodible metal.

It will be observed that the metal members of the glazing members $a$, $b$ which are exposed to the atmosphere, and acid or alkaline fumes present in the air, are composed of corrosion-resisting metal, or so-called non-corrodible metal, and that these metal members co-operate with one another and with the asphaltic strips and with the glass panes 22 to practically seal the outer surfaces of the glazing members and thereby protect the steel-supporting members or upright bars 10 from attack by the external corrodible gases.

In the double glazing construction herein shown, it will be observed that the glazing members a, b are separated from each other by their common supporting members or upright bars 10, preferably of steel, which can be made of any desired strength to sustain the load and which permits a range of choice in the sash member used to meet any condition of loading or span.

It will also be observed that the supporting members or upright bars 10 at the sides of the box-like glazing structure can be attached to the frame or wall of the building, as by angle irons 40, only one of which is shown in Fig. 5.

It will further be observed that the air in the box-like glazing construction is substantially trapped and as it is desirable that said air should have a slow circulation through the box-like structure, the lowermost channeled cross bar 12 of one or both members a, b is provided with weep holes 42 (see Fig. 6) through which the air in the box-like structure may escape slowly, and thus avoid fog and condensation between the layers of glass and also to permit any water of condensation which may be formed to be removed.

The double glazing construction offers a high degree of heat insulation, which minimizes the difficulties due to condensation in mills and like places in which the atmosphere within the building carries a high degree of humidity, and especially in those buildings which house processes that generate large quantities of vapor, and particularly vapor charged with acid and alkaline fumes or gases from which the steel-supporting members or bars 10 are protected.

It will also be observed that the glass panes are supported by cushioning or yielding material, preferably strips of felt impregnated with asphalt, and without the use of putty, which minimizes glass breakage due to vibrations and settlements in the building framework.

In the double glazing construction herein shown, the glass panes within the building are capable of being quickly and easily removed for cleaning or replacement, entirely independent of the glass panes on the outside of the buildings and vice versa.

In the present instance the invention is shown as embodied in a double glazing construction in which the glazing members a, b are located on opposite sides of interposed supporting members, and the panes of glass in each member are independently accessible, but it is not desired to limit the invention to the particular embodiment shown, as either glazing member a or b may be used to advantage. It will further be observed that the channels in the cross bars 12 are located in a plane substantially parallel with and separate from or outside of the plane in which the supporting members 10 are located, which enables the glass panes to be made of greater width than the opening between adjacent supporting members and yet be bodily movable into and out of the channels in the cross bars and have the sides of the glass panes overlap the supporting members, and further enables the supporting members when made of steel or other corrodible metal to be covered on their outer surfaces by a maximum area of glass and a minimum area of non-corrodible elements which protect the outer surfaces of the corrodible supporting members from exposure to the atmosphere and corrodible gases present therein.

The bottom portion of the box-like structure may be filled with asphaltic concrete or other suitable material, not shown, but which is indicated by the dotted line 200 in Fig. 3, and the top surface of this filling material may be downward inclined from the outer member a toward the inner member b with its lower side substantially flush with the bottom wall of the weep openings 42.

What is claimed is:

1. In a glazing construction, in combination, a series of supporting members, channeled bars spaced apart and extended across said supporting members on the outside thereof, and a glass pane supported by said channeled bars on the outer side of said supporting members in a separate plane therefrom and bodily movable into and out of the channels in adjacent bars, and a cap member associated with each supporting member and covering the side edge portion of the glass pane whereby the supporting members are protected from the weather.

2. In a glazing construction, in combination, a supporting member, channeled bars spaced apart and extended across said supporting member on the outside thereof, and a glass pane supported by said channeled bars on the outer side of said supporting member and bodily movable into and out of the channels in adjacent bars, cushioning members in said channels for engaging opposite edges of said glass pane, a cushioning member interposed between said supporting member and the inner surface of the glass pane at the side thereof, a cap member outside of said cross bars and extended lengthwise of said supporting member, a sealing member between said cap member and the outer surface of said glass pane, and means for securing said cap member to said supporting member.

3. In a glazing construction, in combination, a series of supporting members, cross bars spaced apart and extended across said supporting members on the outside thereof in a separate plane therefrom and provided with channels in their adjacent surfaces, one of the channels in one cross bar being deeper than an opposing channel in an adjacent cross bar, a glass pane bodily movable into and out of said channels and normally retained therein by the walls of said channels, and a cap member associated with each supporting member and covering the side edge portion of the glass pane whereby the supporting members are protected from the weather.

4. In a glazing construction, in combination, a series of supporting members, cross bars spaced apart and extended across said supporting members on the outside thereof in a separate plane therefrom and provided with channels in their adjacent surfaces, one of the channels in one cross bar being deeper than an opposing channel in an adjacent cross bar, a glass pane bodily movable into and out of said channels and normally retained therein by the walls of said channels, means in said channels for cushioning said glass pane, and a cap member associated with each supporting member and covering the side edge portion of the glass pane whereby the supporting members are protected from the weather.

5. In a glazing construction, in combination, a supporting member, channeled cross bars extended across said supporting member on the outside thereof and spaced apart, glass panes having their top and bottom edges inserted into adjacent channels of adjacent cross bars and having the sides of adjacent panes overlapping said supporting member on the outer side thereof, cushioning means between the outer surface of said supporting member and the overlapping sides of said adjacent glass panes, a cap member extended lengthwise of said supporting member and secured thereto, sealing means between said cap member and the outer surfaces of said adjacent glass panes, and means for securing said cap member to said supporting member.

6. In a glazing construction, in combination, supporting members, a plurality of cross bars located on the outside of said supporting members and provided with channels in their upper and lower surfaces, a glass pane inserted into the upper and lower channels of adjacent cross bars, a device inserted into the upper channel of the topmost cross bar and secured to said supporting member, and a device inserted into the lower channel of the lowermost cross bar and secured to said supporting member.

7. In a glazing construction, in combination, a series of supporting members, glass-supporting bars located on the outer and inner sides of said supporting members and secured thereto, glass panes carried by said supporting bars in front of and in separate planes from that in which the supporting member is located and co-operating with the latter to form a double glazing construction with an interposed supporting member, the glass panes of the inner glazing construction being accessible and removable independently of the glass panes of the outer glazing construction, and cap members associated with said supporting members and covering the edge portions of the glass panes whereby the supporting members are protected from the weather.

8. In a glazing construction, in combination, a supporting member, glass-supporting bars located on the outer and inner sides of said supporting member and secured thereto, glass panes carried by said supporting bars and co-operating therewith to form a double glazing construction with an interposed supporting member, the glass panes of the inner glazing construction being accessible and removable independently of the glass panes of the outer glazing construction, and closure members co-operating with the double glazing constructions to form a substantially closed box-like structure in which the supporting member is located and protected from external gases.

9. In a glazing construction, in combination, a supporting member, glass-supporting bars located on the outer and inner sides of said supporting member and secured thereto, glass panes carried by said supporting bars and co-operating therewith to form a double glazing construction with an interposed supporting member, the glass panes of the inner glazing construction being accessible and removable independently of the glass panes of the outer glazing construction, closure members co-operating with the double glazing construction to form a substantially closed box-like structure in which the supporting member is located and protected from external gases, and means for obtaining a slow circulation of air through the box-like structure.

10. In a glazing construction, in combination, a plurality of substantially parallel supporting members, channeled cross bars secured to said supporting members at the opposite sides of the latter and spaced apart, glass panes removably supported by said channeled cross bars and co-operating therewith to form a double glazing construction with interposed supporting members, and closure members co-operating with the top and bottom channeled bars of said double glazing construction to form a substantially closed box-like glazing structure within which the said supporting members are located.

11. In a glazing construction, in combination, a plurality of substantially parallel supporting members, channeled cross bars secured to said supporting members at the opposite sides of the latter and spaced apart, glass panes having their upper and lower edges inserted into adjacent channels in adjacent cross bars and having the adjacent sides of adjacent panes overlapping a supporting member, and a cap member co-operating with the overlapping sides of adjacent glass members and extended lengthwise of the supporting member overlapped by said glass members, and means for detachably securing said cap member to said overlapped supporting member.

12. In a glazing construction, in combination, supporting members spaced apart, cross bars secured to said supporting members and spaced apart to form an opening, said cross bars having channels extended transversely of said opening in a plane in front of the outer surfaces of said supporting members and of a depth sufficient to permit a glass pane of greater width than said opening to be bodily inserted into said channels and have the sides of said glass pane overlap said supporting member in front of the latter.

13. In a glazing construction, in combination, supporting members spaced apart, cross bars extended across an intermediate supporting member and spaced apart to form a plurality of openings on opposite sides of said intermediate supporting member, said cross bars being secured to said supporting members and having in their adjacent surfaces channels extended across the intermediate supporting member to the supporting members on opposite sides thereof in a plane in front of said supporting members and of a depth sufficient to permit glass panes of greater width than said openings to be bodily inserted into said channels and positioned in a plane in front of said supporting members with their adjacent sides overlapping said intermediate member.

14. In a glazing construction, in combination, supporting members spaced apart, cross bars secured to the outer surface of said supporting members to form therewith a plurality of openings above and below an intermediate cross bar, channels in the upper and lower surfaces of said intermediate cross bar, channels in the adjacent surfaces of the cross bars above and below said intermediate cross bar, said channels being located in a plane in front of the supporting members and being of a depth sufficient to permit panes of glass of greater width than said openings to be bodily inserted into said channels and having their sides overlap said supporting members in front of the latter.

In testimony whereof, I have signed my name to this specification.

GEORGE W. THOMAS.